United States Patent
Srinivasa

(10) Patent No.: US 7,543,297 B2
(45) Date of Patent: Jun. 2, 2009

(54) COLLABORATIVE PLANNING ACTIONS AND RECIPES

(75) Inventor: Deepak M Srinivasa, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 700 days.

(21) Appl. No.: 10/720,894

(22) Filed: Nov. 24, 2003

(65) Prior Publication Data

US 2005/0114859 A1   May 26, 2005

(51) Int. Cl.
 G06F 9/46 (2006.01)
 G06F 15/16 (2006.01)
(52) U.S. Cl. .................. 718/106; 718/104; 709/201; 709/202; 709/205
(58) Field of Classification Search ............... 718/106, 718/104; 709/201–203
See application file for complete search history.

(56) References Cited

U.S. PATENT DOCUMENTS

| | | | | |
|---|---|---|---|---|
| 6,330,583 | B1 * | 12/2001 | Reiffin | 718/105 |
| 6,915,212 | B2 * | 7/2005 | Kamps | 702/14 |
| 7,155,715 | B1 * | 12/2006 | Cui et al. | 717/177 |
| 7,188,343 | B2 * | 3/2007 | Sanchez et al. | 718/100 |
| 2002/0156932 | A1 * | 10/2002 | Schneiderman | 709/317 |
| 2003/0120620 | A1 * | 6/2003 | Fromherz et al. | 706/45 |
| 2003/0154177 | A1 * | 8/2003 | Holland et al. | 706/60 |
| 2003/0167293 | A1 * | 9/2003 | Zhu et al. | 709/102 |

FOREIGN PATENT DOCUMENTS

JP     05-108355    4/1993

OTHER PUBLICATIONS

Liden-L.; "The integration of autonomous and scripted behavior through task management"; Artificial Intelligence and Interactive Entertainment. Papers from the 2000 AAAI Symposium, 2000, p. 51-5, 0 refs, pp. iv+82.*
Long-M-T et. al; "Distributed multi-agent diagnosis and recovery from sensor failures"; 2003 IEEE/RSJ International Conference on Intelligent Robots and Systems, Las Vegas, NV, USA, Oct. 27-31, 2003.*
Hadad, Meirav, "Temporal Reasoning for a Collaborative Planning Agent in a Dynamic Environment," Annals of Mathematics and Artificial Intelligence, Apr. 2003, vol. 37, Issue 4, pp. 1-4, 9-30.

* cited by examiner

Primary Examiner—Patrice Winder
Assistant Examiner—Lin Liu
(74) Attorney, Agent, or Firm—George R. McGuire; Bond, Schoeneck & King, PLLC

(57) ABSTRACT

The complexities of actions and recipes used in collaborative planning are defined using set theory and an accompanying formalization. The formalizations presented can be used as a basis for making decisions in relation choosing recipes, and other activities concerning collaborative task execution in a multi-agent environment. Introducing the notion of the complexity of a recipe and an action provides a measure of the difficulty of a task, based upon which decisions regarding the use of particular recipes and contractors can be made.

17 Claims, 6 Drawing Sheets

```
for i=1 to length(actions)

if (actions[i].basicLevel())
            actions[i].complexity=[actions[i].cost];
            for j=1 to length(actions[i].actionOf())
                    (actions[i].actionOf())[j].updateRequired=true;
            end for
    end if for j=1 to length(actions[i].contractors())
            if actions[i].complexity=[ ]
                    actions[i].complexity=
                    contractors[(actions[i].contractors())[j]].getComplexity(actions[i]);
            else
                    actions[i].complexity=actions[i].complexity
                    contractors[(actions[i].contractors())[j]].getComplexity(actions[i]);
            end if
            for j=1 to length(actions[i].actionOf())
                    (actions[i].actionOf())[j].updateRequired=true;
            end for
    end for end for
```

FIG. 3

```
bothDone=false;

while(! bothDone)

while(!recipeDone)
                recipeDone=true;
                for i=1 to length(recipes)
                        if (recipes[i].updateRequired)
                                recipes[i].complexity=[0];
                                for j=1 to length(recipes[i].actions())
                                        recipes[i].complexity=recipes[i].complexity
                                        (recipes[i].actions())[j].complexity;
                                end for
                                recipeDone=false;
                                for j=1 to length(recipes[i].recipeFor())
                                        (recipes[i].recipeFor())[j].updateRequired=true;
                                end for
                        end if
                end for
        end while while(!actionDone)
                actionDone=true;
                for i=1 to length(actions)
                        if (actions[i].updateRequired)
                                actions[i].complexity= ;
                                for j=1 to length(actions[i].recipes())
                                        actions[i].complexity=actions[i].complexity
                                        (actions[i].recipes())[j].complexity;
                                end for
                                actionDone=false;
                                for j=1 to length(actions[i].actionOf())
                                        (actions[i].actionOf())[j].updateRequired=true;
                                end for
                        end if
                end for
        end while if (recipeDone && actionDone)
                bothDone=true;
        else
                recipeDone=false;
                actionDone=false;
        end if end while
```

FIG. 4

COLLABORATIVE PLANNING ACTIONS AND RECIPES

FIELD OF THE INVENTION

The present invention relates to collaborative planning actions and recipes.

BACKGROUND

Collaboration of multiple agents to solve problems is an area of active research. Collaboration, in this context, is a special type of coordinated activity in which the agents attempt to achieve a shared goal. The agents work with each other, performing a task or activities needed to satisfy a shared goal.

Collaborative behavior is arguably synergistic in nature, that is, such behavior can be more than the sum of individual acts. Collaboration may be distinguished from both interaction and simple coordination in terms of the mutual commitments agents make to achieve an agreed result. Collaboration is arguably a system feature that must be inherently designed, rather than being subsequently added.

When multiple agents work together in collaboration to accomplish certain tasks, the agents create plans to perform these tasks and, ultimately, the agents execute their plans. A collaborative task in which software agents are expected to participate has certain characteristics. These characteristics can be listed as: (i) limited resources (including, for example, time constraints), (ii) multiple levels of action decomposition, (iii) a combination of group and individual activities, (iv) partial knowledge on the part of each agent, and (v) the need for coordination and negotiation between agents.

To understand the nature of collaborative tasks, and the importance of planning in the whole process, consider the following scenario. A network of computers is used for scientific computing. The network administrator (NA) needs to analyze processor and disk usage in the network to rearrange the clusters and hence obtain better performance from the network. Assume that there is a single maintenance port open on each node, where queries regarding system usage can be made. A constraint is specified that only one query can be running at any particular time on a node.

In this case, the NA uses two maintenance agents (that is, software agents) and commands these agents to work together to report of CPU usage and disk usage on various nodes in the network. For convenience, the software agents used in the following example are referred to as Jack and Jill.

Jack and Jill jointly decide that Jack will collect the CPU usage statistics from the network, and Jill will collect the disk usage statistics from the network, and that Jack and Jill will jointly prepare a final report to be submitted to the NA. These three subactions (namely: (i) collecting the CPU statistics, (ii) collecting the disk usage statistics, and (iii) prepare the final report) constitute a high level recipe for carrying out the action specified by the NA.

Other recipes could be devised for the same task. Such alternative recipes may involve deciding to divide the set of nodes into two and each agent handles both the CPU and disk queries for the subset of nodes to which the agent is committed, and then combining and submitting the results.

After a recipe is established and agreed upon, Jack and Jill must each form their own individual plan. Jack's plan is for collecting CPU statistics and Jill's plan is for collecting the disk usage statistics. Jack and Jill need not know the complete details of each other's plans, but each need to avoid conflicts arising between their respective plans. For example, Jack and Jill must negotiate on their itinerary for visiting the nodes so that their itineraries do not clash. Thus, as the agents develop their individual plans, each agent must watch for potential conflicts with the plans of other agents, and coordinate with potentially conflicting agents as required. Further, Jack and Jill need to have a shared plan for the third action, namely preparing the final report.

Each of these three actions outlined above in the recipe is complex, in the sense that the recipe requires further decomposition. Hence, Jack must develop a recipe for collecting CPU usage statistics, which will likely involve visiting a node and executing a particular command on the maintenance port. Similarly, Jill must develop a recipe for collecting disk usage statistics. Jack and Jill must then develop, negotiate and agree upon a plan for preparing the report, which is to be performed together. This recipe might specify that each agent push the data collected for each node into a database, and then format the report from his data using routines provided by the database management system.

Alternatively, since Jack and Jill are not specialists in writing and formatting reports, Jack and Jill might decide to contract this action of formatting the report to another agent, named here for convenience as ReporterAgent. ReporterAgent's contract is to fetch the data from the database (once, of course, Jack and Jill have pushed the relevant statistics into different tables of the database), and use a word processing application to prepare a suitably formatted report.

Various other specific examples of agent-based collaborate planning tasks exist. Several important points can be drawn from the above example, and other such examples. First, plans are not just recipes. Recipes only specify how to perform an action. Consequently, considerations that must be taken into account during planning include: (i) whether an agent intends to perform the actions, (ii) whether the agent is capable of performing the actions, (iii) whether the agent believes so, (iv) whether the agent decides to contract out a particular action, (v) the commitment that the agent has towards the success of the group, and (vi) the means-ends reasoning that results because of this mutual commitment between agents.

Second, each agent is an autonomous entity. Each agent has particular recipe library and is aware of the actions that the agent can perform and, by omission, those actions that the agent cannot perform. There is no central controlling or coordinating authority and hence the intelligence required in performing the tasks collaboratively is completely distributed.

The formalization of collaborative planning primarily concerns modeling the "mental states" of agents involved in collaborative activities. These mental state specifications constitute individual and shared plans for agents. Efforts to formalize the principles of collaborative planning also include specifying the capability to act, mental attitudes such as beliefs and intentions required for participants in a group activity, specification of individual and shared plans. Set theory and first order logic can be used to present formal models of plans and other mental states of agents.

The following lists enumerate major components of individual and group plans. These principles and components are the entities that are modelled during formalization.

To have an individual plan for an action, one needs:
(i) knowledge of a recipe,
(ii) ability to perform subactions, and
(iii) intentions to do the subactions.

To have a group plan for an action, one needs:
(i) mutual belief of a recipe,
(ii) individual or group plans for the subactions,
(iii) intentions that group perform actions, and (iv) intentions that collaborators succeed.

Formalization modeling the above elements of a plan (individual or group) provides a theoretical foundation to build multi-agent systems for a variety of practical applications. Modeling also helps in validating and verifying key results in the field of collaborative planning.

SUMMARY

The complexities of actions and recipes used in collaborative planning are introduced and formalized. An extension is provided to the existing theory of collaborative planning. Implementation issues associated with such formalizations presented are also addressed. The formalizations present can be used as a basis for making intelligent decisions in relation choosing recipes, performing actions, exchanging recipes, and other activities concerning collaborative task execution in a multi-agent environment.

The notion of a recipe and an action is defined using set theory. The complexity of a recipe and an action is also defined. The datastructures and the algorithms required to implement such formalism are also addressed. The use and importance of this formalism, and associated implementation structures, are also considered. Particular issues that are addressed include:
- a mutually recursive definition of the complexity of a recipe and an action,
- an extension of the definition to the case of contracting, and
- datastructures and algorithms for implementing formalizations.

Introducing the notion of the complexity of a recipe and an action provides a measure of the difficulty of a task, based upon which decisions regarding the use of particular recipes and contractors can be made.

Further, such a complexity measure can be a basis for presenting other notions for quantifying various aspects of collaborative planning. For example, if an agent is successful in executing actions below a certain complexity, that agent's capability in handling complexity can be gauged.

DESCRIPTION OF DRAWINGS

FIG. 3 is a first part of algorithmic code used to iteratively calculate the complexity of actions and recipes.

FIG. 4 is a second part of algorithmic code used to iteratively calculate the complexity of actions and recipes.

DETAILED DESCRIPTION

Figure 1:
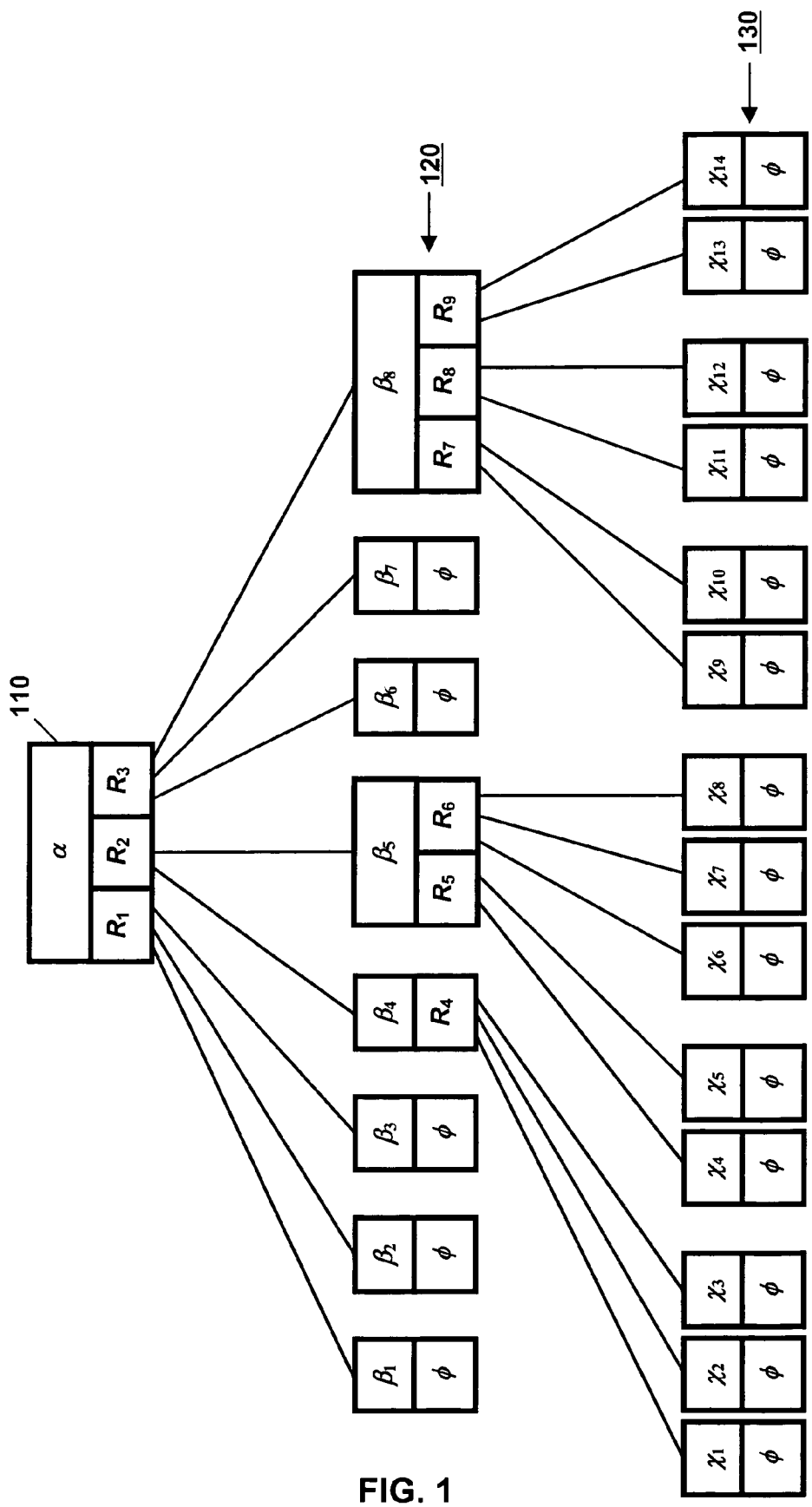
FIG. 1 is a schematic representation of a recipe tree for an arbitrary action $\alpha$.

The techniques described herein present various results in colloboative planning. These include the ability to:
1. extend the formalism of a recipe,
2. measure the complexities of alternative choices in performing an action,
3. formalize the complexity of performing an action,
4. formalize the complexity of using a recipe,
5. develop data structures and algorithms for implementing the formalizations developed.

The implications of these developments include the following.
1. Reaching a consensus on a recipe during negotiation, to establish a mutual belief of a recipe.
2. Deciding between the different contracting options available.
3. Deciding between the different collaborating options available.
4. Developing new metrics to indicate the success or failure of a recipe (or an agent using a recipe) over a period of time.
5. Providing a basis for exchanging recipes and hence increasing the usefulness of the agent's individual recipe libraries.

Definitions and Notation

In the description that follows, the concept of a Sequenced-Set is introduced, along with associated auxiliary operations. The concept of a SequencedSet is used to define the notions of an action and a recipe for an action. These definitions and notations are used in the following description.

SequencedSet

A SequencedSet is defined as an ordered pair (A, M), where A is a multi-set of elements and M is a mapping from A to a finite subset of natural numbers specifying the sequence of the elements of A.

The definition of a SequencedSet is presented in Equation [1] below.

$$S = (A, M)$$

$$A = \{a_1, a_2, \ldots a_i\} \text{ and}$$

$$M: A \to N_A \text{ where } N_k = \{1, 2, 3 \ldots k\} \qquad [1]$$

With the definition of a SequencedSet in Equation [1] above, the following ordering relation $\ltimes$ is defined in Equation [2] below.

$$\text{Let } \ltimes: A \to A \ \forall a_i, a_j \in A, ((a_i, x) \in M \wedge (a_j, y)$$
$$\in M \wedge x < y) \to (a_i, a_j) \in \ltimes \qquad [2]$$

Equation [2] above establishes that the relation $a_i \ltimes a_j$ implies that the element $a_i$ is sequenced before the element $a_j$ in set A under the relation M.

The successor and predecessor operators are defined in Equation [3] below, in which the symbol $\nexists$ indicates "there does not exist".

$$\forall a_i, a_j \in A, \text{successor}(a_i) = a_j \leftrightarrow (a_i \ltimes a_j \wedge \nexists a_k$$
$$A(a_i \ltimes a_k) \wedge (a_k \ltimes a_j))$$

$$\forall a_i, a_j \in A, \text{predecessor}(a_j) \leftrightarrow \text{successor}(a_i) = a_j \qquad [3]$$

The notation presented below in Equation [4] for a SequencedSet S=(A, M) is used herein for brevity.

$$S = [a_1, a_2, a_3, \ldots, a_i] \text{ where each } a_k \in A \text{ and } |A| = i \qquad [4]$$

The sequencing relation M is captured in the order in which the elements are written. If subscripts are used, then i<j implies that $a_i \ltimes a_j$.

Let a null SequencedSet be defined as follows. Let S=(A, M) be a SequencedSet. If A=$\phi$ and M=$\phi$, then the Sequenced-Set S is said to be null, which is represented as S=$\phi$.

Two operations are now defined on SequencedSets. These defined operations subsequently used to define the complexity of actions and recipes.

Union Operation ∪ for SequencedSets

Let $S_1$ and $S_2$ be two SequencedSets defined below in Equation [4].

$$S_1 = (A_1, M_1), M_1: A_1 \rightarrow N_{|A_1|}$$

$$S_2 = (A_2, M_2), M_2: A_2 \rightarrow N_{|A_2|} \quad [4]$$

The union operation for SequencedSets represented by ∪ is defined in Equation [5] below.

$$S_1 \cup S_2 = (A_1 \cup A_2, M) \quad [5]$$

In Equation [5] above, M is defined as follows M: $A_1 \cup A_2 \rightarrow N_{|A_1 \cup A_2|}$. Further, the relations defined in Equation [6] below also apply.

$$\forall_x \in A_1, (x, n) \in M_1 \rightarrow (x, n) \in M$$

$$\forall_y \in A_2, (y, m) \in M_2 \rightarrow (y, m + |A_1|) \in M \quad [6]$$

The union operation for SequencedSets is not commutative. Thus, $S_1 \cup S_2 \neq S_2 \cup S_1$.

Choice Operation ⓒ Under the Operation λ for SequencedSets

Let $S_1$ and $S_2$ be two SequencedSets defined by Equation [7] below.

$$S_1 = (A, M_1), M_1: A \rightarrow N_{|A|}$$

$$S_2 = (B, M_2), M_2: B \rightarrow N_{|B|} \quad [7]$$

Let λ be any binary operation that can operate on the elements of A and B. Then the choice operation ⓒ is defined by the pseudocode operations presented below in Table 1.

TABLE 1

Let S = $S_1$ ⓒ $S_2$ under λ
If $S_1$ = φ then S = $S_2$ else
Let S = (X, M) such that
(a ∈ A ∧ b ∈ B) → a λ b ∈ X
((a, n) ∈ $M_1$ ∧ (b, m) ∈ $M_2$) → (a λ b, (n − 1) |B|+m) ∈ M If $S_1$ = (A, $M_1$) and $S_2$ = (B, $M_2$) and A ⊂ N and B ⊂ N (where N is the set of natural numbers) then let the operation ⓒ under the operation addition (+) be represented as ⊞. An example is illustrated below as Equation [8] for two SequencedSets [5, 2, 3] and [1, 2].

$$[5, 2, 3] \boxplus [1, 2] = [5+1, 5+2, 2+1, 2+2, 3+1, 3+2] = [6, 7, 3, 4, 4, 5] \quad [8]$$

Actions

An action ∝ is a unit of work is carried out by the agents. The predicate basic level(∝) is true if ∝ is an action that can be performed by an agent without any further elaboration. If the predicate basic.level(∝) is false, that is ¬basic.level(∝) holds, the action ∝ is by implication complex, and is composed of multiple steps. This, in turn, means that the action ∝ requires elaboration about how to perform the action, in the form of a collection of subactions. This collection of subactions is called a recipe.

An agent G is either able to perform a basic level action ∝ or not. This is indicated by the truth or falsity of a predicate Exec(∝). If the action is complex, then the agent G might have recipes that specify how the action is to be performed or the agent G might not have any recipes at all. The function recipes (∝) returns a SequencedSet $R_\alpha$. Table 2 below presents various results relating to a SequencedSet $R_\alpha$.

TABLE 2

$R_\alpha$ = recipes(α) is a SequencedSet.
$R_\alpha$ = (R, M) where
$R_\alpha$ = { $r^1_\alpha, r^2_\alpha, \ldots, r^i_\alpha$ } where 'i' is the total number of recipes the agent G has for executing$_\alpha$.
and M is the relation indicating the sequence of the recipes in the set R.

This can be represented as $R_\alpha = [r^1_\alpha, r^2_\alpha, \ldots, r^i_\alpha]$ in conformity with the notation used herein.

Although the set of recipes that an agent G holds for executing an action ∝ need not be sequenced, such a set is represented as a SequencedSet in this work. This approach is taken in view of the way in which the complexity of performing an action is handled, and how one selects between the various alternative recipes available. Accordingly, as a choice of a recipe must be specified, the recipes for an action must be sequenced.

Finally, different costs are involved in executing different basic level actions. This is true because although a basic level action needs no elaboration for an agent, one basic level action could be significantly complex (for example, in terms of processing time and memory) than another basic level action. The function cost(∝) provides an integer measure indicating the cost of performing the basic level action α by that agent.

Recipe

As described above, a recipe is an elaboration of how to perform an action. A recipe consists of subactions to be performed to bring about the main action. Since subactions are performed in a particular order, a recipe must be defined as a SequencedSet.

Thus, a recipe $r_\alpha$ for an action ∝ is a SequencedSet $r_\alpha = (\beta, \delta)$ where β is the set of subactions and δ is the sequencing relation. Using the notation used herein, a recipe $r_\alpha$ can be represented as $r_\alpha = [\beta_1, \beta_2, \ldots \beta_k]$. From the definition of the ordering operator ⋉ provided herein, $\beta_i \ltimes \beta_j$ implies that the subaction $\beta_i$ should be performed before the subaction $\beta_j$ in order to execute ∝. Each of these subactions, in the recipe for ∝, may be basic or complex. Thus, these subactions may in turn have their own recipes (if the subactions are complex).

From the above explanation, each action is associated with a SequencedSet of recipes that the agent holds, and each recipe is associated with a SequencedSet of subactions.

FIG. 1 presents the relations between recipes and actions for an agent. There are choices to be made regarding the recipe that is to be applied.

FIG. 1 is a full recipe tree, in the sense that the recipe tree captures all available alternatives. Every node in this full recipe tree is an action. Each node contains a list of recipes. The node has two parts. The upper half contains the action that the node represents. The lower half contains the list of recipes available for that action. From each of these recipes, there emanates a set of links to subactions. A primary level (∝) 110 spawns a secondary level ($\beta_1$ to $\beta_8$) 120, which is in turn spawns a tertiary level ($\chi_1$ to $\chi_{14}$) 130.

These are the subactions that are to be performed according to that recipe in order to bring about its main action. These children emanating from the recipe are also ordered, from left to right. The leftmost child is the subaction that needs to be performed first and so on. In this manner, a full recipe tree captures all the choices that can be made at every stage of executing the root action. At every node, there are choices for the recipes, or there is no recipe at all. There are two cases to be considered when there is no recipe for an action.

If an action $\alpha$ is a basic level action, then there is no need to specify a recipe for that action. The agent can execute that action in the first instance without further elaboration. For completeness, however, the recipe $r_\alpha$ is defined for a basic level action $\alpha$ is a null SequencedSet. Therefore, $r_\alpha = \phi$. By the definition of the null SequencedSet provided above, this means that the set of recipes is null and the sequencing relation is also null. This rigor in formalization allows convenient definition of further concepts and notions, as later described herein.

If the action is not basic (which implies that there is a need for a recipe), and yet the agent does not have a recipe for the action in its recipe library, then the SequencedSet recipes($\alpha$) for that action is the null SequencedSet. Therefore, in this case $R_\alpha = \phi$. Thus the two cases can be distinguished by whether recipes($\alpha$)=[$\phi$], or recipes($\alpha$)=$\phi$. The first alternative is always true when basic level($\alpha$), and the second alternative represents lack of recipe knowledge.

The SequencedSet $R_\alpha$=recipes($\alpha$) gives the recipes held by a particular agent. Different agents might have different recipes for performing the same actions. The same applies for the recipes that might be required for executing subactions.

Complexity of an Action and a Recipe

Complexity measure for an action indicates how complex the action is to perform. Since there are choices available in terms of recipes at each stage, there are several complexities associated with an action (union of all the complexity measures of the recipes for that action), each instance representing a particular set of choices made.

Complexity measure of a recipe indicates how complex the action is to follow that recipe to execute the intended action. This is an aggregate of the complexities of the subactions that the action entails. Since the definitions of the complexity measures of an action and a recipe are inherently entangled in this way, these complexity measures are defined in a mutually recursive manner as follows.

Basic Definition of Complexity

A mutually recursive definition of complexities of action and recipe is given below. The definition of the complexity of an action uses the complexity of a recipe and the definition of the complexity of a recipe uses the complexity of an action. In the description and the example that follows, this is not an incomplete or invalid definition.

The following definition of the complexity of an action $\alpha$, represented by $C_x(\alpha)$ is as follows in Equation [9] below.

$$(\exists R_a = \text{recipes}(a) | R_a \neq \phi \wedge R_a = [r_a^1, r_a^2, \ldots r_a^n]) \rightarrow C_x(a) = \bigcup_{1 \text{ to } n} C_x(r_a^i) \otimes$$

$$(\not\exists R_a = \text{recipes}(a) | R_a \neq \phi) \rightarrow C_x(a) = [\alpha] \quad [9]$$

The formal definition of the complexity of a recipe $r_a$ represented by $C_x(r_a)$ is as follows in Equation [10] below.

$$r_a = \phi \rightarrow C_x(r_a) = [\text{cost}(a)] \otimes$$

$$(r_a \phi \wedge r_a = [\beta_1, \beta_2, \ldots, \beta_k]) \rightarrow C_x(r_a) = C_x(\beta_1) \boxplus C_x(\beta_2) \boxplus \ldots \boxplus C_x(\beta_k) \quad [10]$$

The symbol $\otimes$ in the above definition stands for the exclusive-or operator, as described above. The definition of the complexity of an action is such that if an agent contains recipes for that action, then the complexity of that action is the union (as described above) of the complexities of those recipes. If the agent does not contain any recipes for that action, then the complexity of that action will be infinite. (Basic level actions contain null recipes, and hence the complexity of basic level actions does not turn out to be infinite.)

This definition of the complexity of a recipe implies that if a recipe is a null SequencedSet (which actually means that the action for which the recipe is catering to is a basic level action), then the complexity is defined as a SequencedSet which has one element, which is cost($\alpha$). If, however, the recipe is not a null SequencedSet, then the recipe contains a list of subactions, in which case, the complexity of that action is the result of the choice operation $\copyright$ under addition represented by $\boxplus$ performed on all the complexities of the subactions in the order in which these subactions are to be performed.

EXAMPLE

An example calculation of the complexity of the action $\alpha$ given in FIG. 1 is now described using Equation [11] below The cost(action) function for all the basic level actions of FIG. 1 is assumed to yield a value of 1. That is, the cost of performing all the basic level actions in this particular example is taken to be the same, which is one unit.

$$(a) = C_x(R_1) \cup C_x(R_2) \cup C_x(R_3) \quad [11]$$

Each of the terms in the right hand side of Equation [11] above are calculated using Equations [12], [13] and [14] below.

$$C_x(R_1) = C_x(b_1) \boxplus C_x(b_2) \boxplus C_x(b_3) \quad [12]$$
$$= [1] \boxplus [1] \boxplus [1]$$
$$= [3]$$

$$C_x(R_2) = C_x(\beta_4) \boxplus C_x(\beta_5) \quad [13]$$
$$= C_x(R_4) \boxplus (C_x(R_5) \cup C_x(R_6))$$
$$= (C_x(\chi_1) \boxplus C_x(\chi_2) \boxplus C_x(\chi_3)) \boxplus$$
$$((C_x(\chi_4) \boxplus C_x(\chi_5)) \cup (C_x(\chi_6) \boxplus C_x(\chi_7)$$
$$\boxplus C_x(\chi_8)))$$
$$= ([1] \boxplus [1] \boxplus [1]) \boxplus$$
$$(([1] \boxplus [1]) \cup ([1] \boxplus [1] \boxplus [1]))$$
$$= ([3]) \boxplus ([2] \cup [3])$$
$$= [3] \boxplus [2, 3]$$
$$= [5, 6]$$

$$C_x(R_3) = C_x(b_6) \boxplus C_x(b_7) \boxplus C_x(b_8) \quad [14]$$
$$= [1] \boxplus [1] \boxplus (C_x(R_7) \cup C_x(R_8) \cup C_x(R_9))$$
$$= [1] \boxplus [1] \boxplus ((C_x(b_9) \boxplus C_x(b_{10})) \cup$$
$$(C_x(b_{11}) \boxplus C_x(b_{12})) \cup (C_x(b_{13}) \boxplus C_x(b_{14})))$$
$$= [1] \boxplus [1] \boxplus (([1] \boxplus [1] \cup$$
$$([1] \boxplus [1]) \cup ([1] \boxplus [1]))$$
$$= [1] \boxplus [1] \boxplus ([2] \cup [2] \cup [2])$$
$$= [1] \boxplus [1] \boxplus [2, 2, 2]$$
$$= [1] \boxplus [3, 3, 3]$$
$$= [4, 4, 4]$$

Using Equations [12] to [14] above, the results expressed below in Equation [15] are obtained.

$$C_x(a) = [3] \cup [5, 6] \cup [4, 4, 4]$$

$$C_x(a) = [3] \cup [9, 9, 9, 6, 6, 6]$$

$$C_x(a) = [12, 12, 12, 13, 13, 13] \quad [15]$$

The results of Equation [15] above mean that the action can be performed in 6 different ways due to the different recipes available at each stage. The complexity of performing the action for each of those choices can also be determined. Here, the first three choices take 12 units of complexity to perform the action, and the last three take 13 units of complexity to perform.

Contracting Cases

In the above definition, the complexity of performing an action is defined as infinite if the agent does not possess a recipe for that action. This rule can be relaxed, because, often in collaborative tasks, agents contract out certain actions to other agents.

In such cases, agents do not have recipes to perform the action, but they can find agents which can perform those actions. The agents to which the action is contracted out should be able to give a measure of the complexity of performing that task, and hence the contracting agent should be able to take into account the contribution of this action to the overall complexity. In order to support these aspects in the definitions of the complexity of an action and a recipe, further functions are defined below.

The function contractors($\propto$) returns a SequencedSet $G_\propto$. $G_\propto$=contractors($\propto$) is a SequencedSet. That is, $G_\propto$=(G, M), where $G_\propto = \{g^1_\propto, g^2_\propto, \ldots, g^m_\propto\}$. In this case, "m" is the total number of agents the agent G can contract the action $\propto$ for executing, and M is the relation indicating the sequence of the agents in the set G.

This relation can be represented as $G_\propto = [g^1_\propto, g^2_\propto, \ldots, g^m_\propto]$ for consistency with the notation given earlier.

Another function called $CC_x(g, \alpha)$ is also defined. This function returns a SequencedSet containing only one element. This element is the complexity measure (a number) for performing the action $\propto$, as returned by the agent 'g'. So, this function entails initiating communication with the other agent, giving this other agent information about the action that is contracted out, and obtaining information about the complexity of performing that action.

Although this is a single number that the agent 'g' returns, this number is cast as a SequencedSet, because this number can be combined with the other choices available. Also note that although an agent might have different recipes to choose from for an action and its subactions, the agent 'g' to which the action has been contracted out provides only one number as the complexity. This is because the decision of the recipes and other choices to be made are made internally by the agent 'g' and the agent presents only the best possible (least complex, considering various factors) measure to the contracting agent.

This kind of complexity is termed herein as black-box complexity. This term is used because the contracting agent does not know about the choices that were available internally to "g" and the decisions taken. For the contracting agent, however, the actions that the agent performs itself are well known, in terms of the choices available and the decisions made. Therefore this kind of complexity is termed herein as white-box complexity.

Taking contracting into account and using the functions contractors($\propto$) and $CC_x(g, \alpha)$ the definition of the complexity of an action and a recipe can be extended as follows.

The formal definition of the complexity of an action $\propto$, represented by $C_x(\propto)$ is as follows in Equation [16] below.

1. $(\exists R_a=\text{recipes}(a)|R_a \neq \phi \wedge R_a=[r_a^1, r_a^2, \ldots r_a^n]) \wedge$ $(\exists G_a=\text{contractors}(a)|G_a \neq \phi \wedge G_a=[g_a^1, g_a^2, \ldots g_a^m]))$ $C_x(a) = (^{i=1 \, to} \cup^n C_x(r_a^i)) \cup (^{i=1 \, to} \cup^n CC_x(g_a^i, a)) \otimes$ 2. $(\exists R_a=\text{recipes}(a)|R_a \neq \phi \wedge R_a=[r_a^1, r_a^2, \ldots r_a^n]) \wedge$ $(\nexists G_a=\text{contractors}(a)|G_a \neq \phi))$ $C_x(a) = ^{i=1 \, to} \cup^n C_x(r_a^i) \otimes$ 3. $(\nexists R_a=\text{recipes}(a)|R_a \neq \phi) \wedge$ $(\exists G_a=\text{contractors}(a)|G_a \neq \phi \wedge G_a=[g_a^1, g_a^2, \ldots g_a^m]))$ $C_x(a) = ^{i=1 \, to} \cup^n CC_x(g_a^i, a) \otimes$ 4. $((\nexists R_a=\text{recipes}(a)|R_a \neq \phi) \wedge (\nexists G_a=\text{contractors}(a) |G_a \neq \phi)) \rightarrow C_x(a)=[\infty]$     [16]

The formal definition of the complexity of a recipe $r_\propto$ for an action $\propto$ represented by $C_x(r_\propto)$ is as follows in Equation [17] below.

$r_a = \phi \rightarrow C_x(r_a) = [\text{cost}(a)] \otimes$ $(r_a \neq \phi \wedge r_a=[\beta_1, \beta_2, \ldots, \beta_k]) \rightarrow C_x(r_a) = C_x(\beta_1) \boxplus C_x(\beta_2) \boxplus \ldots \boxplus C_x(\beta_k)$     [17]

In the case that a contractor exists, the complexity that the contractor offers for that action is taken into account. Only the definition of the complexity of an action changes as a result of introducing the notion of contracting. The definition of the complexity of a recipe remains unchanged.

There are four mutually exclusive cases in the definition of the complexity of an action. The first case refers to the presence of recipes with the agent for performing the action and also the presence of agents for contracting out the action. The second case refers to the presence of recipes with the agent and the absence of agents for contracting. The third case refers to the presence of agents for contracting but the absence of recipes with the agent. The fourth case refers to the absence of both agents and recipes.

Only in the last case does the complexity of an action becomes infinity. The choices now include the contracting options, even if the agent has recipes to perform the action itself. This is because the agent can make more informed decisions with this data. For example, if the complexity of performing an action by the agent itself (for which the agent has the recipe) is much greater than the complexity of the action when the action contracted out, the agent may decide to contract out the action.

Implementation

The formalizations described above to determine the complexities of actions and recipes use mutual recursion. There are direct techniques available in current programming languages to implement mutual recursion. Therefore, the definitions are directly implementable various computer languages, such as C, C++ or Java. The function call stack builds up rapidly, however, in the case of mutual recursion.

Constructing the full recipe tree for an action is thus, not an optimal solution; as the full recipe tree is to be constructed for every action that the agent holds in the agent's library of actions. This comprehensiveness implies that the task is time-consuming. Thus, due to its implications for consumption of both memory and processing time, a straightforward implementation is not particularly efficient.

Accordingly, datastructures and algorithms are described that can be used to more efficiently realize a method that does not require mutual recursion to determine the complexities of actions and recipes. An iterative technique is used for the purpose. Further, once the complexities of the actions and the recipes in the agent library are calculated, incremental methods can be established to update the complexity values in case of additions/deletions to the recipes and actions in the agent library. While mutual recursion provides ease and elegance during definition, implementation of this approach adds a lot of complexity during implementation. Thus, iterative techniques are preferred during implementation.

Representation and Storage

Figure 2:
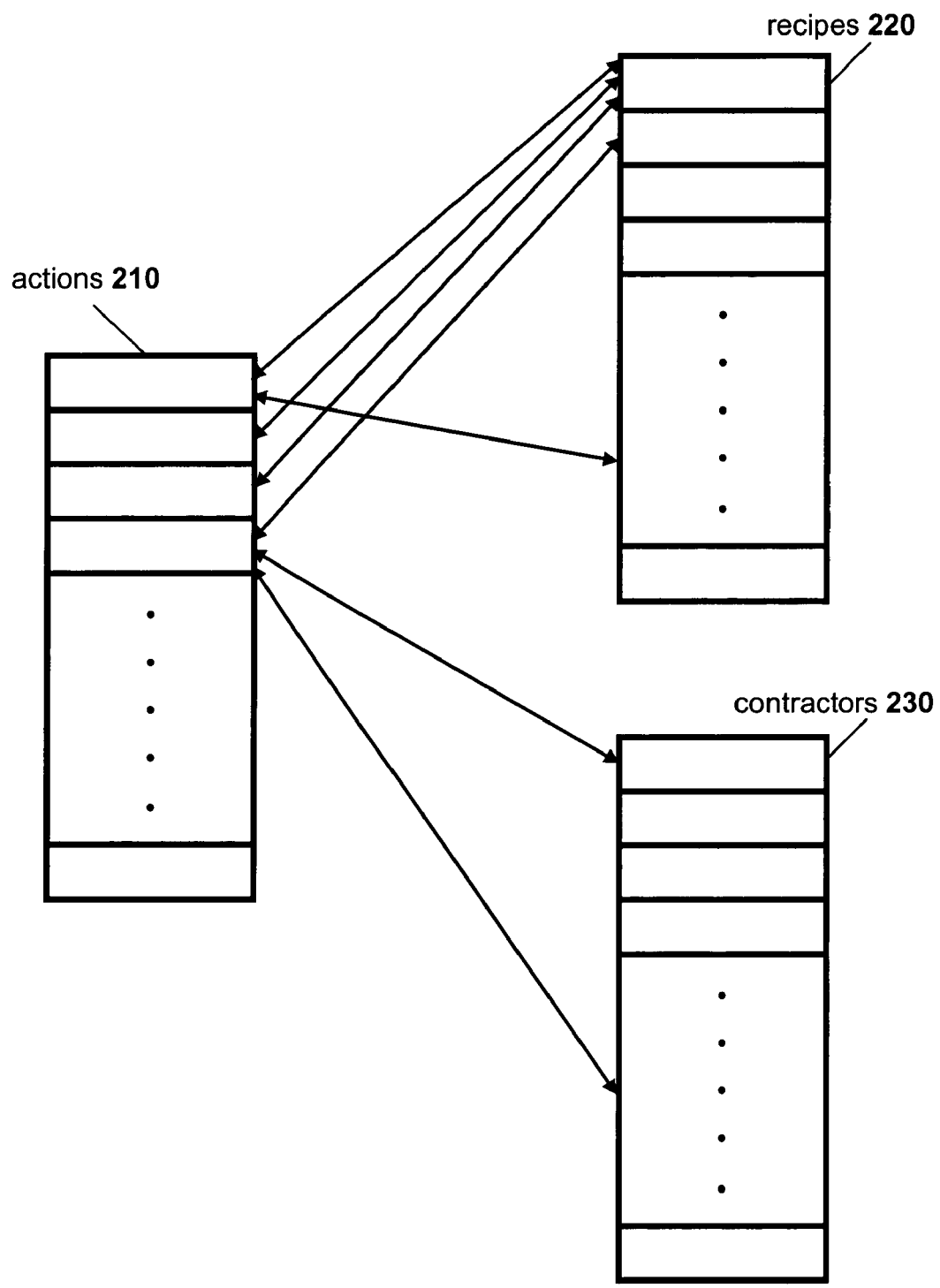
FIG. 2 is a schematic representation of a library of actions, recipes and contractors for an agent.

FIG. 2 represents the three arrays that comprise each agent. Each agent holds three important arrays: (i) an actions array 210, (ii) a recipes array 220 and (iii) a contractors array 230. Each array is simply an ordered list. The relations between these arrays 210 to 230 are represented. These relations are structured as data pointers.

Every action in the actions array 210 is linked to zero or more recipes in the recipes array 220. These are the recipes that the agent can use in order to execute the action. This corresponds to the recipes( ) function used in the above-described formalization. Each action also points to a list of contractors 230 to which the agent can contract the action. These lists of pointers maintained in the arrays are all ordered, and hence a SequencedSet data structure is used.

The recipes array 220 holds all the recipes that the agent is aware of at any given moment. Each recipe in this array points to a list of actions. This is the list of actions that needs to be performed in order to execute the action to which the recipe caters. A particular recipe could be used for more than one action. Again, the set of actions 210 that is being pointed to by each recipe in the array is ordered. Thus, a SequencedSet data structure is used.

The pointers used to represent links between the various arrays are bi-directional. Thus, if an action has several recipes that can be used, each of those recipes point back to the action for which the action is a recipe. The same applies to the actions that are specified in a recipe.

Each action, recipe and contractor can be modeled as an object that has several attributes and provides a list of publicly usable functions. The attributes and functions that are required for the purposes of explaining the implementation regarding the complexity of action and recipe are described below.

- An array is indexed using the [index] notation. For example, to access the $i^{th}$ action of the actions array, one would write actions[i]. This notation is the same as that described above for a SequencedSet.
- action.basicLevel( ) function returns a Boolean value. This function returns true if the action is basic for the agent. If the function is complex (meaning that the agent cannot perform the action in one step, and hence needs a recipe or a contractor), the function returns false.
- action.complexity is the attribute that is used to store the complexity values in terms of a SequencedSet. The same applies to recipes.complexity.
- length(array) returns the number of elements in that array.
- action.actionOf( ) function returns the array of recipes for which action is listed as a sub-action.
- action.recipes( ) function returns the array of recipes that the agent holds to execute the action.
- action.contractors( ) function returns the array of contractors that the agents knows to contract the action.
- recipe.actions( ) function returns the array of actions that needs to be performed according to the recipe.
- recipe.recipeFor( ) function returns the array of actions for which recipe can be used.
- action.updateRequired is a Boolean attribute that is used to indicate if further update of the complexity value is required or not. The same applies for recipe.updateRequired.

Algorithm

With the above data representation and constructs, an algorithm is outlined that performs the calculation of the complexity of actions and recipes in an iterative manner, without resorting to mutual recursion. A pseudocode listing of the algorithm is presented in two parts, in FIG. 3 and FIG. 4. The advantages of using this algorithm are discussed below.

Figure 5:
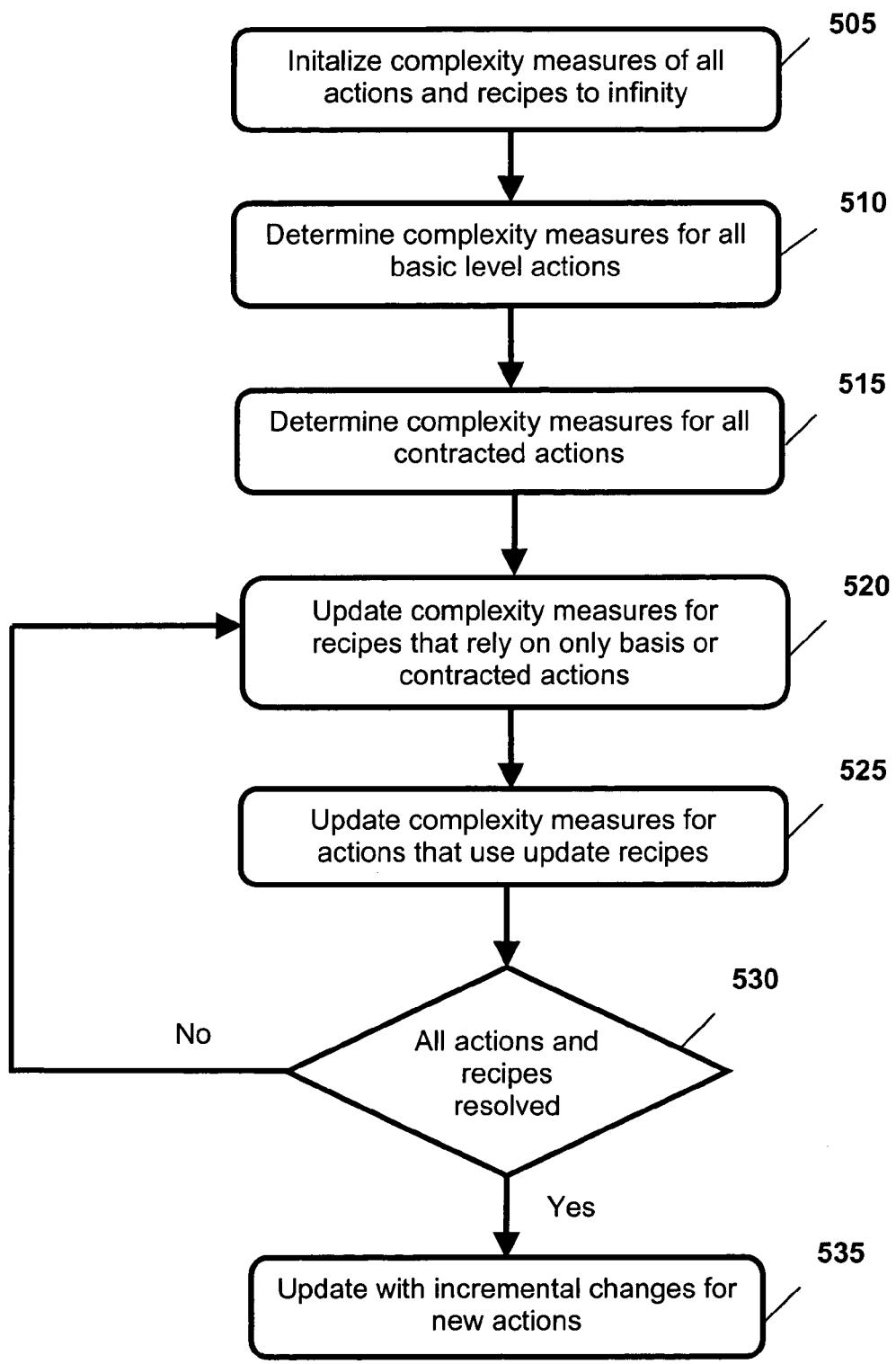
FIG. 5 is a flowchart that summarises an algorithm, presented using algorithmic code in FIGS. 3 and 4, used to iteratively calculate the complexity of actions and recipes.

Mostly, a C-like syntax is used in the algorithmic code presented in FIG. 3 and FIG. 4. FIG. 5 flowcharts an overview of the steps performed by the algorithm. The complexity measures of all actions and recipes are initialized to infinity in step 505. The algorithm first updates the complexity of all the basic level actions with a cost factor in step 510.

The algorithm then proceeds to update the complexities of those actions that can be contracted out in step 515. The crux of the algorithm lies in the iterations performed over the actions array and recipes array successively until all the complexity values are resolved. The trace of an initial few iterations is as follows.

Once the basic level actions and the contractual actions are updated with complexity values, an iteration on the recipes array is performed. During this iteration, those recipes that use only the basic actions or contractual actions (there ought to be some recipes like that, if the agent can get any work done at all), will be updated with their complexity values in step 520. This triggers further updates in the complexity values of the actions that use those recipes. So, an iteration on the actions array is performed in step 525. Since more of the actions are now resolved, some of the recipes can be handled. Hence another iteration on the recipes array is performed in step 525.

This process is repeated in step 530 until all the possible complexities of the actions and the recipes are resolved. Those complexity values that cannot be resolved remain as infinity, which is correct according to the definition. Once the calculations for the complexities are done for the current set of actions and the recipes that the agent holds, any new additions or deletions to the library are dealt with in an incremental manner. Thus, if a new action is added, the updateRequired field of the corresponding recipes are changed in step 535. The while loop (while (!bothDone)) is executed again to update the library with new complexity values. Thus, only the minimum required calculations are performed.

Operations used during these iterations are those of the SequencedSets defined above under the subsection entitled "Definitions and notation". This procedure performs only the calculations that are required, which is quite not true in the case of a direct implementation through mutual recursion. Hence, no redundant calculations are performed. Also, there are no trees constructed and the calculation is performed inline, thus reducing necessary memory requirements.

Computer Hardware and Software

Figure 6:
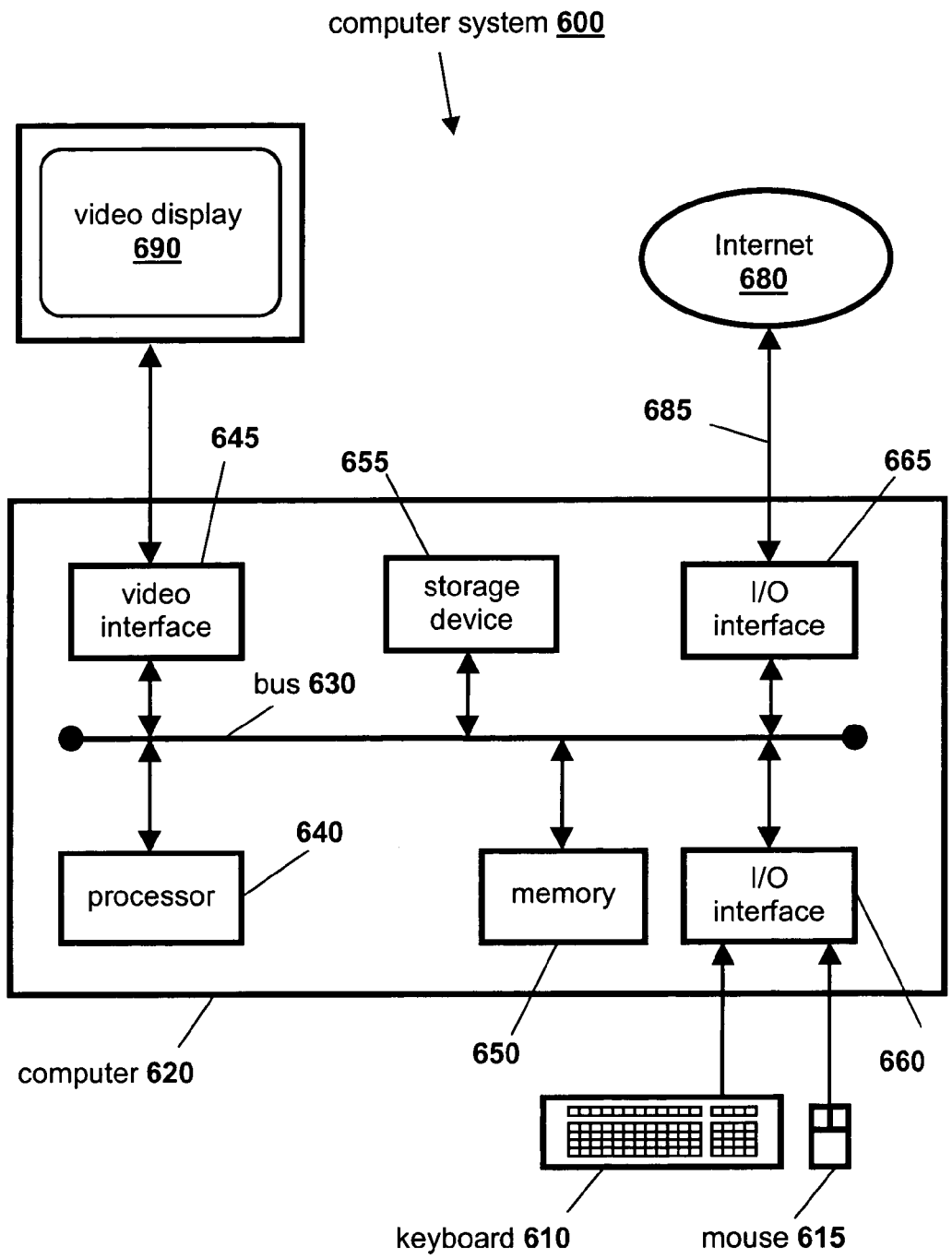
FIG. 6 is a schematic representation of a computer system suitable for performing the techniques described with reference to FIGS. 1 to 5.

FIG. 6 is a schematic representation of a computer system 600 that can be used to implement the techniques for assessing the relative complexity of different options for performing a task, as described herein. Computer software executes under a suitable operating system installed on the computer system 600 to assist in performing the described techniques. This computer software is programmed using any suitable computer programming language, and may be thought of as comprising various software code means for achieving particular steps.

The components of the computer system 600 include a computer 620, a keyboard 610 and mouse 615, and a video display 690. The computer 620 includes a processor 640, a memory 650, input/output (I/O) interfaces 660, 665, a video interface 645, and a storage device 655.

The processor 640 is a central processing unit (CPU) that executes the operating system and the computer software executing under the operating system. The memory 650 includes random access memory (RAM), serving in part as a logic element, and read-only memory (ROM), and is used under direction of the processor 640.

The video interface 645 is connected to video display 690 and provides video signals for display on the video display 690. User input to operate the computer 620 is provided from the keyboard 610 and mouse 615. The storage device 655 can include a disk drive or any other suitable storage medium.

Each of the components of the computer 620 is connected to an internal bus 630 that includes data, address, and control buses, to allow components of the computer 620 to communicate with each other via the bus 630.

The computer system 600 can be connected to one or more other similar computers via a input/output (I/O) interface 665 using a communication channel 685 to a network, represented as the Internet 680.

The computer software may be recorded on a portable storage medium, in which case, the computer software program is accessed by the computer system 600 from the storage device 655. Alternatively, the computer software can be accessed directly from the Internet 680 by the computer 620. In either case, a user can interact with the computer system 600 using the keyboard 610 and mouse 615 to operate the programmed computer software executing on the computer 620.

Other configurations or types of computer systems can be equally well used to implement the described techniques. The computer system 600 described above is described only as an example of a particular type of system suitable for implementing the described techniques.

CONCLUSION

The invention has general application in computational science and, in one instance, in the administration and use of a networked computer system. Various alterations and modifications can be made to the techniques and arrangements described herein, as would be apparent to one skilled in the relevant art.

I claim:

1. A method in a computer system for assessing the relative complexity of different options for performing a task by the computer system, the method comprising the steps of:
    storing programming instructions on a storage medium of the computer system;
    executing the instructions by the computer system, wherein the executing causes the computer system to implement a method comprising the steps of:
    defining the task as a sequenced set data structure that specifies actions of the task, and sequence information that specifies the order in which particular actions are to be performed;
    storing recipes available for performing constituent actions of the task as sequenced set data structures that specify subactions of the recipes for the constituent actions, and sequence information that specifies the order in which the subactions are to be performed;
    determining complexity measures associated with performing the task using different combinations of recipes for constituent actions of the task, based upon complexity measures of actions specified by respective combinations of available recipes;
    delegating the defined task to a primary agent for execution of the task by at least one of the primary agent and one or more contracting agents, wherein determining complexity measures of the action is based on mutually exclusive measures comprising (i) the presence of recipes with the primary agent for performing the action and also the presence of agents for contracting out the action; (ii) the presence of recipes with the primary agent and the absence of agents for contracting; (iii) the presence of agents for contracting and the absence of recipes with the primary agent; and (iv) the absence of both agents and recipes; and
    presenting a report of the complexity measures associated with performing the task.

2. The method as claimed in claim 1, wherein complexity measures for actions are defined in terms of the complexity measures of available recipes for performing the actions, and complexity measures for recipes are defined in terms of the complexity of the subactions of the recipe.

3. The method as claimed in claim 1, further comprising the steps of:
    determining predetermined complexity measures for basic actions that are not specified by a recipe; and
    determining specified complexity measures for contracted actions that are performed by a different agent.

4. The method as claimed in claim 1, further comprising the alternating steps of:
    updating complexity measures for recipes in relation to actions whose complexity measures are determined; and
    updating complexity measures for actions in relation to recipes whose complexity measures are updated.

5. The method as claimed in claim 1, wherein the complexity measures associated with a particular action performed by a particular agent is based upon the complexity measures for each of the recipes for that action.

6. The method as claimed in claim 1, wherein the sequence information that specifies the order in which particular actions are to be performed specifies, for pairs of actions, that one specified action is sequenced before another specified action.

7. The method as claimed in claim 1, further comprising the step of defining a sequenced set data structure as S=(A, M), ha which A is a multi-set element and M is a sequenced relation that specifies an ordered sequence of the elements A in the sequenced set S.

8. The method as claimed in claim 7, further comprising the step of defining a sequencing relation for the sequenced set data structure S for two elements $a_i$ and $a_j$ of multi-set element A, such that $a_i$ is sequenced before $a_j$ in set A under the relation M.

9. The method as claimed in claim 1, wherein a plurality of series of actions exist for performing the defined task, each of the series of actions having a corresponding complexity, and the method further comprises the step of:
    performing the defined task by executing a selected one of the series of actions, wherein the complexity of the selected series of tasks is less than the complexities of the other series of tasks of the plurality of series of tasks.

10. A method in a computer system for assessing the relative complexity of different options for performing a task-by the computer system, the method comprising the steps of:
    storing programming instructions on a storage medium of the computer system; executing the instructions by the computer system, wherein the executing causes the computer system to implement a method comprising the steps of:

defining the task as a sequenced set data structure that specifies actions of the task, and sequence information that specifies the order in which particular actions are to be performed;

storing recipes available for performing constituent actions of the task as sequenced set data structures that specify subactions of the recipes for the constituent actions, and sequence information that specifies the order in which the subactions are to be performed;

determining complexity measures associated with performing the task using different combinations of recipes for constituent actions of the task, based upon complexity measures of actions specified by respective combinations of available recipes;

delegating the defined task to a primary agent for execution of the task by at least one of the primary agent and one or more contracting agents, wherein determining complexity measures of the action is based on mutually exclusive measures comprising (i) the presence of recipes with the primary agent for performing the action and also the presence of agents for contracting out the action; (ii) the presence of recipes with the primary agent and the absence of agents for contracting; (iii) the presence of agents for contracting and the absence of recipes with the primary agent; and (iv) the absence of both agents and recipes; and wherein a plurality of series of actions exist for performing the defined task, each of the series of actions having a corresponding complexity, and the method further comprises the step of:

performing the defined task by executing a selected one of the series of actions, wherein the complexity of the selected series of tasks is less than the complexities of the other series of tasks of the plurality of series of tasks, and wherein the defined task includes a task for administering a networked computer system.

11. The method as claimed in claim 10, wherein complexity measures for actions are defined in terms of the complexity measures of available recipes for performing the actions, and complexity measures for recipes are defined in terms of the complexity of the subactions of the recipe.

12. The method as claimed in claim 10, further comprising the steps of:

determining predetermined complexity measures for basic actions that are not specified by a recipe; and determining specified complexity measures for contracted actions that are performed by a different agent.

13. The method as claimed in claim 10, further comprising the alternating steps of:

updating complexity measures for recipes in relation to actions whose complexity measures are determined; and updating complexity measures for actions in relation to recipes whose complexity measures are updated.

14. The method as claimed in claim 10, wherein the complexity measures associated with a particular action performed by a particular agent is based upon the complexity measures for each of the recipes for that action.

15. The method as claimed in claim 10, wherein the sequence information that specifies the order in which particular actions are to be performed specifies, for pairs of actions, that one specified action is sequenced before another specified action.

16. The method as claimed in claim 10, further comprising the step of defining a sequenced set data structure as S=(A, M), ha which A is a multi-set element and M is a sequenced relation that specifies an ordered sequence of the elements A in the sequenced set S.

17. The method as claim in claim 16, further comprising the step of defining a sequencing relation for the sequenced set data structure S for two elements $a_i$ and $a_j$ of multi-set element A, such that $a_i$ is sequenced before $a_j$ in set A under the relation M.

* * * * *